United States Patent
Lee et al.

(10) Patent No.: US 12,530,128 B2
(45) Date of Patent: Jan. 20, 2026

(54) MEMORY SYSTEM FOR BACKING UP DATA IN CASE OF SUDDEN POWER-OFF AND OPERATION METHOD THEREOF

(71) Applicant: SAMSUNG ELECTRONICS CO., LTD., Suwon-si (KR)

(72) Inventors: Sangkil Lee, Suwon-si (KR); Hojin Chun, Suwon-si (KR); Chankyung Kim, Suwon-si (KR); Yongjae Lee, Suwon-si (KR); Geunhee Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 138 days.

(21) Appl. No.: 18/054,196

(22) Filed: Nov. 10, 2022

(65) Prior Publication Data

US 2023/0152985 A1     May 18, 2023

(30) Foreign Application Priority Data

Nov. 12, 2021   (KR) .................. 10-2021-0156055
Jun. 23, 2022   (KR) .................. 10-2022-0077088

(51) Int. Cl.
   *G06F 3/06*   (2006.01)

(52) U.S. Cl.
   CPC .......... *G06F 3/0619* (2013.01); *G06F 3/0659* (2013.01); *G06F 3/0673* (2013.01)

(58) Field of Classification Search
   CPC .... G06F 3/0619; G06F 3/0659; G06F 3/0673; G06F 3/0647; G06F 3/068; G06F 11/1441
   See application file for complete search history.

(56) References Cited

U.S. PATENT DOCUMENTS

| | | |
|---|---|---|
| 6,693,840 B2 | 2/2004 | Shimada et al. |
| 7,406,560 B2 | 7/2008 | Bulusu et al. |
| 7,679,133 B2 | 3/2010 | Son et al. |
| 8,032,787 B2 | 10/2011 | Atri et al. |
| 8,553,466 B2 | 10/2013 | Han et al. |
| 8,559,235 B2 | 10/2013 | Yoon et al. |
| 8,654,587 B2 | 2/2014 | Yoon et al. |
| 8,719,610 B2 | 5/2014 | Nowak et al. |
| 9,448,896 B2 | 9/2016 | Gaertner et al. |
| 10,586,581 B1 * | 3/2020 | Patel ............... G11C 13/0026 |

(Continued)

FOREIGN PATENT DOCUMENTS

| CN | 105630692 | 6/2016 |
|---|---|---|
| CN | 108542384 | 9/2018 |

(Continued)

*Primary Examiner* — Khoa D Doan

(74) *Attorney, Agent, or Firm* — Morgan, Lewis & Bockius LLP

(57) ABSTRACT

A memory system includes a first non-volatile memory device, a second non-volatile memory device, at least one volatile memory device configured to store user data or a map table, and a memory controller configured to data-dump the user data from the at least one volatile memory device to the first non-volatile memory device when a sudden power-off occurs. The first non-volatile memory device has a faster speed at which data is written than the second non-volatile memory device and has a smaller capacity than the second non-volatile memory device.

19 Claims, 10 Drawing Sheets

(56) References Cited

U.S. PATENT DOCUMENTS

| | | | |
|---|---|---|---|
| 10,853,241 B2 | 12/2020 | Choi et al. | |
| 2009/0109786 A1 | 4/2009 | Ye et al. | |
| 2010/0214813 A1* | 8/2010 | Choi | G11C 11/005 |
| | | | 365/163 |
| 2011/0233648 A1 | 9/2011 | Seol et al. | |
| 2013/0021842 A1* | 1/2013 | Zhou | G11C 11/16 |
| | | | 365/158 |
| 2017/0053687 A1* | 2/2017 | Hendrickson | G11C 11/1675 |
| 2018/0081570 A1* | 3/2018 | Abe | G06F 3/0616 |
| 2018/0349225 A1* | 12/2018 | Bishnoi | G06F 1/305 |
| 2019/0163628 A1* | 5/2019 | Wang | G06F 12/0246 |
| 2019/0310918 A1* | 10/2019 | Frolikov | G06F 1/3225 |
| 2020/0065029 A1 | 2/2020 | Kim et al. | |
| 2020/0201762 A1* | 6/2020 | Bang | G06F 3/0619 |
| 2021/0124701 A1* | 4/2021 | Lee | G06F 13/4243 |
| 2021/0149804 A1* | 5/2021 | Xin | G06F 12/0607 |
| 2021/0294695 A1* | 9/2021 | Li | G06F 11/3037 |
| 2022/0197787 A1* | 6/2022 | Han | G06F 12/0223 |
| 2022/0214807 A1* | 7/2022 | Oh | G06F 3/0647 |
| 2022/0413762 A1* | 12/2022 | Pletka | G06F 12/0844 |

FOREIGN PATENT DOCUMENTS

| | | |
|---|---|---|
| JP | 2015-174435 | 10/2015 |
| KR | 10-2080089 | 2/2020 |
| KR | 10-2020-0021861 | 3/2020 |

\* cited by examiner

MEMORY SYSTEM FOR BACKING UP DATA IN CASE OF SUDDEN POWER-OFF AND OPERATION METHOD THEREOF

CROSS-REFERENCE TO RELATED APPLICATIONS

This application is based on and claims priority under 35 U.S.C. § 119 to Korean Patent Application Nos. 10-2021-0156055, filed on Nov. 12, 2021, and 10-2022-0077088, filed on Jun. 23, 2022, in the Korean Intellectual Property Office, the disclosures of which are incorporated by reference herein in their entirety.

TECHNICAL FIELD

Embodiments of the inventive concept relate to a memory system, and more particularly, to a memory system for backing up data in case of a sudden power-off, and an operation method thereof.

DISCUSSION OF RELATED ART

In a sudden power-off situation in which power supplied to a memory device is suddenly cut off, user data stored in a volatile memory may not be protected, and data loss may occur.

SUMMARY

Embodiments of the inventive concept provide a memory system for backing up data in a sudden power-off situation, and an operation method thereof.

According to an embodiment of the inventive concept, a memory system includes a first non-volatile memory device, a second non-volatile memory device, at least one volatile memory device configured to store user data or a map table, and a memory controller configured to data-dump the user data from the at least one volatile memory device to the first non-volatile memory device when a sudden power-off occurs. The first non-volatile memory device has a faster speed at which data is written than the second non-volatile memory device and has a smaller capacity than the second non-volatile memory device.

According to an embodiment of the inventive concept, a memory system includes a first non-volatile memory device, a second non-volatile memory device, a third non-volatile memory device configured to store a map table, a volatile memory device configured to store user data, and a memory controller configured to data-dump the user data from the volatile memory device to the first non-volatile memory device when a sudden power-off occurs. The first non-volatile memory device has a faster speed at which data is written than the second non-volatile memory device and has a smaller capacity than the second non-volatile memory device.

According to an embodiment of the inventive concept, a method of operating a memory system including a first non-volatile memory device, a second non-volatile memory device, and a volatile memory device includes writing user data from the volatile memory device to the second non-volatile memory device in a normal operation state, writing the user data from the volatile memory device to the first non-volatile memory device when a sudden power-off occurs, and writing the user data from the first non-volatile memory device to the second non-volatile memory device. The first non-volatile memory device has a faster speed at which data is written than the second non-volatile memory device and has a smaller capacity than the second non-volatile memory device.

BRIEF DESCRIPTION OF THE DRAWINGS

Embodiments of the inventive concept will be more clearly understood from the following detailed description taken in conjunction with the accompanying drawings, in which.

DETAILED DESCRIPTION OF THE EMBODIMENTS

Figure 1:
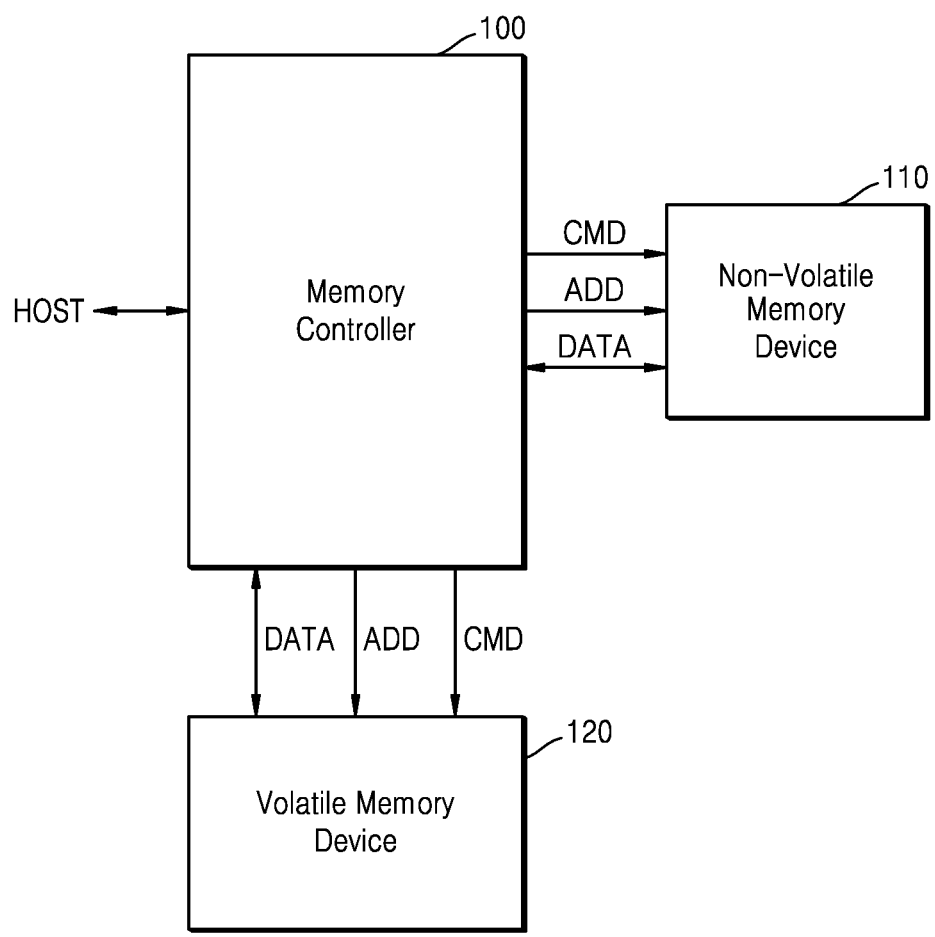
FIG. 1 is a block diagram illustrating an example of a memory system according to an embodiment of the inventive concept.

Hereinafter, embodiments of the inventive concept will be described in detail with reference to the accompanying drawings. Like reference numerals may refer to like elements throughout the accompanying drawings.

It will be understood that the terms "first," "second," "third," etc. are used herein to distinguish one element from another, and the elements are not limited by these terms. Thus, a "first" element in an embodiment may be described as a "second" element in another embodiment.

It should be understood that descriptions of features or aspects within each embodiment should typically be considered as available for other similar features or aspects in other embodiments, unless the context clearly indicates otherwise.

As used herein, the singular forms "a", "an" and "the" are intended to include the plural forms as well, unless the context clearly indicates otherwise. As used herein, the term "and/or" includes any and all combinations of one or more of the associated listed items.

FIG. 1 is a block diagram illustrating an example of a memory system according to an embodiment of the inventive concept.

Referring to FIG. 1, a memory system 10 may include a memory controller 100, a non-volatile memory device 110, and/or a volatile memory device 120. The memory controller 100 controls memory operations, such as programming and reading, by providing various signals to the non-volatile memory device 110 or the volatile memory device 120. For example, the memory controller 100 provides a command CMD and an address ADD to the non-volatile memory device 110 or the volatile memory device 120 to access data DATA of the non-volatile memory device 110 or the volatile memory device 120.

The memory controller 100 may access the non-volatile memory device 110 or the volatile memory device 120 according to a request from the host HOST. The memory controller 100 may use various protocols to communicate with the host HOST. For example, the memory controller 100 may use interface protocols, such as Peripheral Component Interconnect-Express (PCI-E), Advanced Technology Attachment (ATA), Serial ATA (SATA), Parallel ATA (PATA), or Serial Attached SCSI (SAS), to communicate with the host HOST. In addition, various other interface protocols, such as Universal Serial Bus (USB), Multi-Media Card (MMC), Enhanced Small Disk Interface (ESDI), or Integrated Drive Electronics (IDE), may be applied to the protocol between the host HOST and the memory controller 100, but are not limited thereto.

The non-volatile memory device 110 may include various types of memory. For example, the non-volatile memory device 110 may include a flash memory, magnetic RAM (MRAM), ferroelectric RAM (FeRAM), phase change RAM (PRAM), and resistive RAM (ReRAM), but is not limited thereto.

The volatile memory device 120 may include Dynamic Random Access Memory, (DRAM), such as, for example, Double Data Rate Synchronous Dynamic Random Access Memory (DDR SDRAM), Low Power Double Data Rate (LPDDR) SDRAM, Graphics Double Data Rate (GDDR) SDRAM, Rambus Dynamic Random Access Memory (RDRAM), and the like, but is not limited thereto.

The non-volatile memory device 110 or the volatile memory device 120 may communicate with the memory controller 100 through interfaces according to various standards. As an example, the memory controller 100 and the non-volatile memory device 110 or the volatile memory device 120 may communicate with each other via an interface according to a Low Power Double Data Rate (LPDDR) or other various types of standards.

The memory system 10 may correspond to, for example, a solid state drive (SSD). For example, the memory controller 100 may correspond to an SSD controller, and the volatile memory device 120 may correspond to a write buffer. In other words, the memory system 10 may correspond to an SSD including an SSD controller, a write buffer, a non-volatile memory, and/or an auxiliary power source, which are arranged on a printed circuit board (PCB). As an example of the auxiliary power source, a capacitor may be used. Accordingly, as the amount of power consumed by the SSD increases, the capacity of the capacitor may increase. In addition, as the capacitance of the capacitor increases, the area occupied by the capacitor on the PCB may increase, and as a result, the form factor of the SSD may increase.

For the memory system 10 to operate normally, sufficient power should be supplied to the memory controller 100, the non-volatile memory device 110, and the volatile memory device 120. When sufficient power is not supplied to the memory system 10, issues such as, for example, loss of user data, may occur. For example, when a sudden power-off occurs in which power supplied to the memory system 10 is suddenly cut off, user data stored in a write buffer included in the volatile memory device 120 may be lost.

Large-capacity capacitors may be utilized to protect user data when a sudden power-off occurs. For example, when a sudden power-off occurs, the memory controller 100 may back up user data stored in the write buffer included in the volatile memory device 120 to the non-volatile memory device 110 by using a large-capacity capacitor. For example, when a sudden power-off occurs, the memory controller 100 may back up user data stored in a write buffer in DRAM to a single level cell (SLC) area of a vertical NAND (V-NAND) memory device by using large-capacity capacitors. When user data is backed up in the SLC area of the V-NAND memory device, the SLC area of the V-NAND memory device may have a longer backup time of user data because the data write speed is slow. In addition, as a write operation occurs for each NAND memory device connected to all channels and ways of the V-NAND memory device, performing user data backup may use a large amount of power. As the time used for backing up user data increases and the power used for backing up user data increases, the capacity of the capacitor used for the memory system 10 may increase. When the capacity of the capacitor increases, a memory system 10 having a small form factor may not be achieved, which may be disadvantageous in terms of production cost of the memory system 10. The memory system according to an embodiment may include a non-volatile memory device, such as MRAM, which may allow for data-dumping user data to the non-volatile memory device, such as the MRAM, and reducing a capacity of a capacitor. Further details related to the memory system including a non-volatile memory device, such as MRAM, according to embodiments of the inventive concept will be described below.

Figure 2:
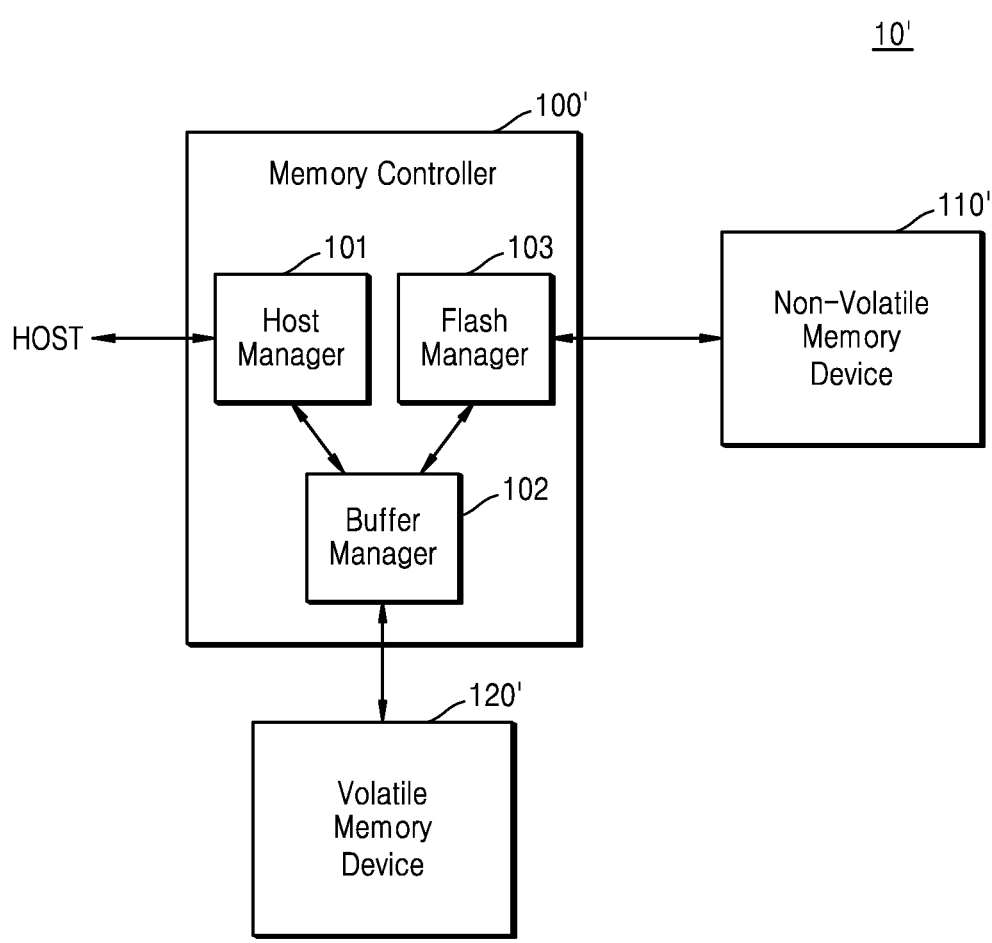
FIG. 2 is a block diagram illustrating an example of a memory system according to an embodiment of the inventive concept.

FIG. 2 is a block diagram illustrating an example of a memory system according to an embodiment of the inventive concept.

Referring to FIG. 2, a memory system 10' may include a memory controller 100', a non-volatile memory device 110', and/or a volatile memory device 120'. The memory controller 100', the non-volatile memory device 110', and the volatile memory device 120' of the memory system 10' may correspond to the memory controller 100, the non-volatile memory device 110, and the volatile memory device 120 of the memory system 10 of FIG. 1, respectively.

The memory controller 100' may include a host manager 101, a buffer manager 102, and/or a flash manager 103. The host manager 101 may be configured to communicate with the host, the buffer manager 102 may be configured to communicate with the volatile memory device 120', and the flash manager 103 may be configured to communicate with the non-volatile memory device 110'.

Even when a sudden power-off occurs, the memory controller 100' should be able to perform various operations, such as, for example, map table management, data buffer management, block allocation/return, bad block replacement, Reclaim, Wear Leveling, Compaction, Garbage Collection, non-volatile memory interface scheduling, and defense code, and thus, user data backup may utilize a long operation time and much power. As described above, as the time utilized for backing up user data increases and the power utilized for backing up user data increases, the capacity of the capacitor used in the memory system 10 may increase. When the capacity of the capacitor increases, a memory system 10' having a small form factor may not be achieved, which may be disadvantageous in terms of production cost of the memory system 10'. The memory system according to an embodiment may include a non-volatile memory device, such as MRAM, which may allow for data-dumping user data to the non-volatile memory device, such as the MRAM, and which may reduce the capacity of a capacitor. Further details related to the memory system including a non-volatile memory device, such as MRAM, according to embodiments of the inventive concept will be described below.

Figure 3:
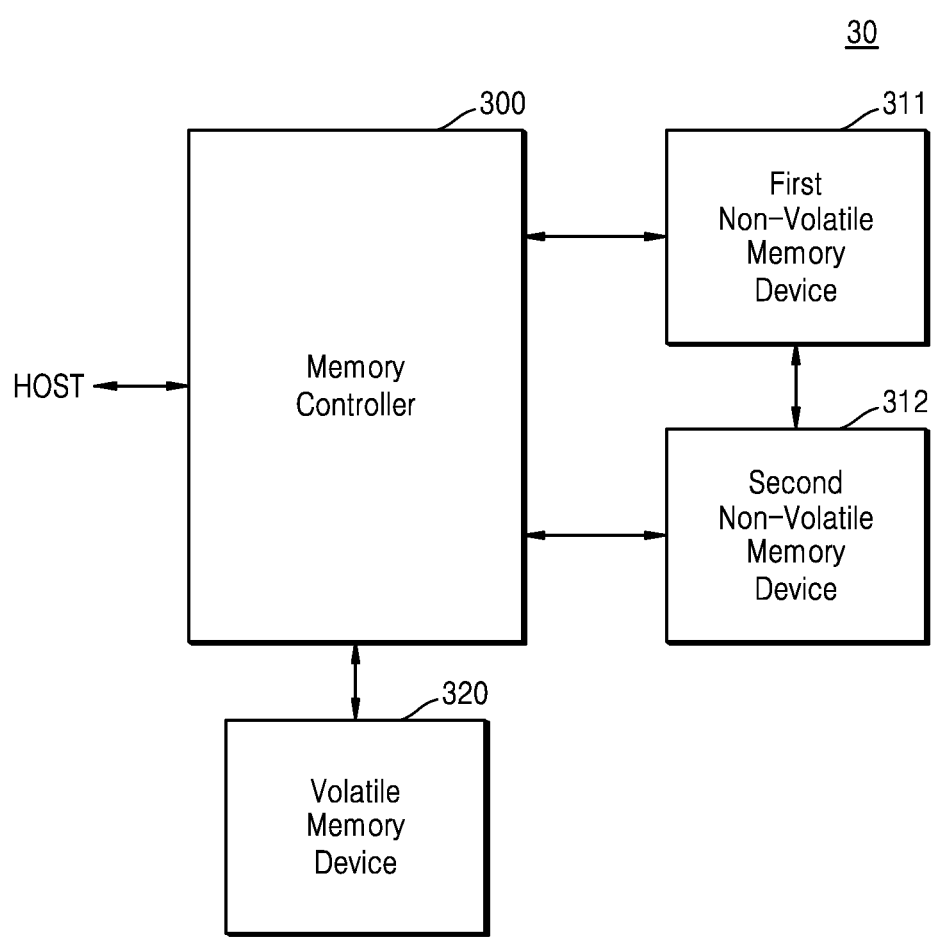
FIG. 3 is a block diagram illustrating an example of a memory system according to an embodiment of the inventive concept.

FIG. 3 is a block diagram illustrating an example of a memory system according to an embodiment of the inventive concept.

Referring to FIG. 3, a memory system 30 according to an embodiment may include a memory controller 300, a first non-volatile memory device 311, a second non-volatile memory device 312, and/or a volatile memory device 320. The memory controller 300, the first non-volatile memory device 311, the second non-volatile memory device 312, and/or the volatile memory device 320 may correspond to the memory controllers 100 and 100', the non-volatile memory devices 110 and 110', and the volatile memory devices 120 and 120' described with reference to FIGS. 1 and 2, respectively.

The volatile memory device 320 may be configured to store user data or a map table. In addition, although the volatile memory device 320 is illustrated as a single volatile memory device 320 in FIG. 3, the memory system 30 may include a plurality of volatile memory devices 320. In other words, the memory system 30 may include at least one volatile memory device 320 according to embodiments.

The memory controller 300 may be configured to write user data from the volatile memory device 320 to the second non-volatile memory device 312 in a normal operation state. For example, the memory controller 300 may move data from the volatile memory device 320 to the second non-volatile memory device 312 without passing through the first non-volatile memory device 311 in a normal operation state.

The memory controller 300 may be configured to data-dump user data from at least one volatile memory device 320 to the first non-volatile memory device 311 when a sudden power-off occurs. The first non-volatile memory device 311 may be a memory device used only when a sudden power-off occurs.

The memory controller 300 may be configured to write user data stored in the first non-volatile memory device 311 to the second non-volatile memory device 312.

The first non-volatile memory device 311 may have a faster data write speed and a smaller capacity than the second non-volatile memory device 312. For example, the first non-volatile memory device 311 may be MRAM, and the second non-volatile memory device 312 may be a NAND flash memory device, but is not limited thereto.

When a sudden power-off occurs, the memory controller 300 data-dumps user data from at least one volatile memory device 320 to the first non-volatile memory device 311, and thus, the memory system 30 may protect the user data. In addition, since the speed at which data is written to the first non-volatile memory device 311 is faster than that of the second non-volatile memory device 312, the data backup time may be reduced when the user data is data-dumped from the volatile memory device 320 to the first non-volatile memory device 311, compared with the case that the user data is data-dumped from the volatile memory device 320 to the first non-volatile memory device 312, and the amount of power used may be reduced. Due to a decrease in data backup time and a decrease in the amount of power used, the capacity of the capacitor of the memory system 30 may be reduced, and thus, the memory system 30 may be implemented in a small form factor and may be produced at a low cost.

When the memory system 30 is implemented in a small form factor, a memory device having a larger capacity may be implemented in the memory system 30 having the same size. In addition, when a memory device having a larger capacity is implemented in the memory system 30, the number of memory systems 30 may be reduced for the same capacity, and thus, total cost of ownership (TCO) may be improved.

Figure 4:
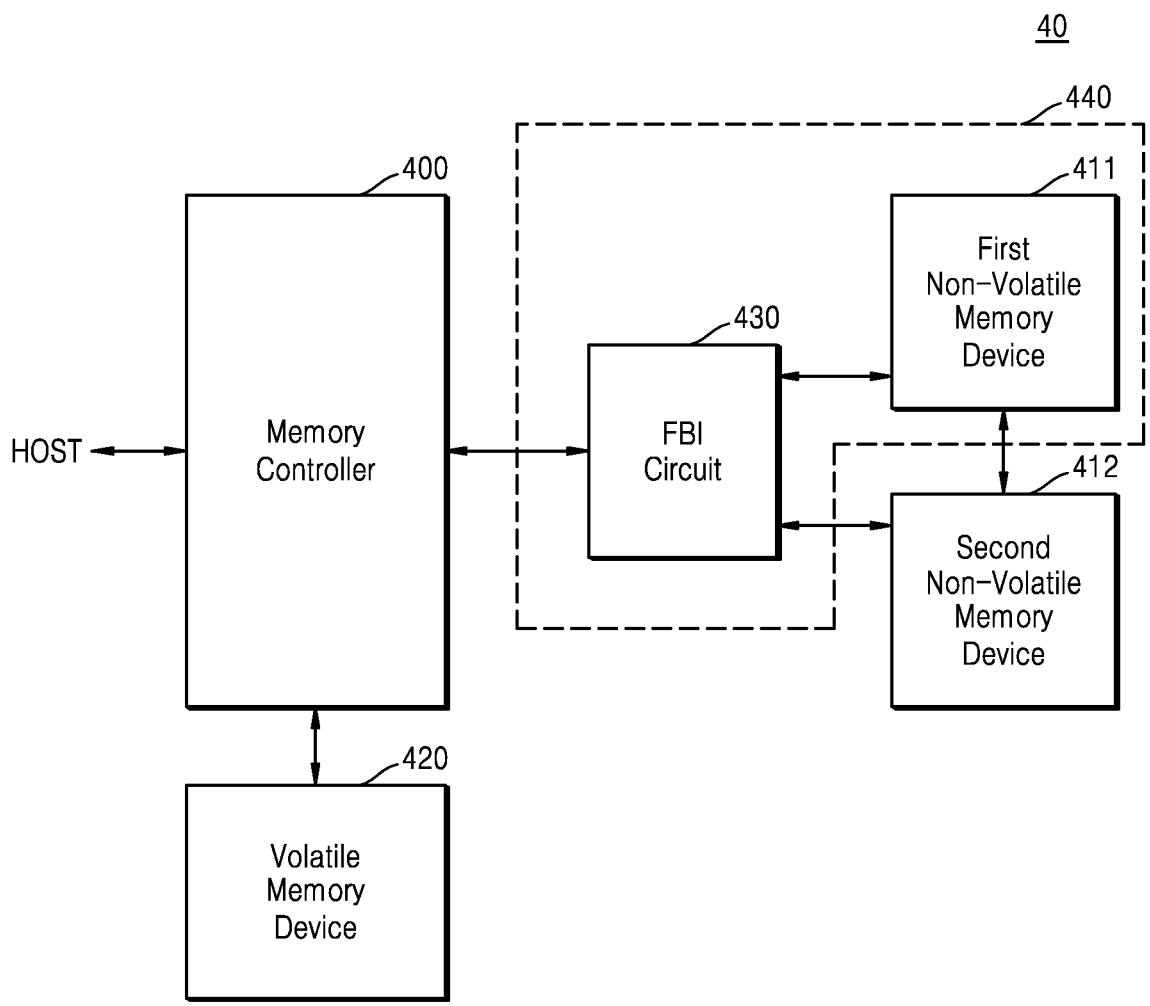
FIG. 4 is a block diagram illustrating an example of a memory system according to an embodiment of the inventive concept.

FIG. 4 is a block diagram illustrating an example of a memory system according to an embodiment of the inventive concept.

Referring to FIG. 4, a memory system 40 according to an embodiment may include a memory controller 400, a first non-volatile memory device 411, a second non-volatile memory device 412, a volatile memory device 420, and/or a frequency boosting interface (FBI) circuit 430. The memory controller 400, the first non-volatile memory device 411, the second non-volatile memory device 412, and the volatile memory device 420 may correspond to the memory controller 300, the first non-volatile memory device 311, the second non-volatile memory device 312, and the volatile memory device 320 of FIG. 3, respectively.

The first non-volatile memory device 411 and the FBI circuit 430 may be implemented as a single chip 440. In other words, the first non-volatile memory device 411 and the FBI circuit 430 may be mounted on the same one chip 440.

The memory controller 400 may be configured to communicate with the first non-volatile memory device 411 or the second non-volatile memory device 412 through the FBI circuit 430.

In addition, in an embodiment, the first non-volatile memory device 411 and the second non-volatile memory device 412 may also be configured to communicate with each other through the FBI circuit 430.

Figure 5:
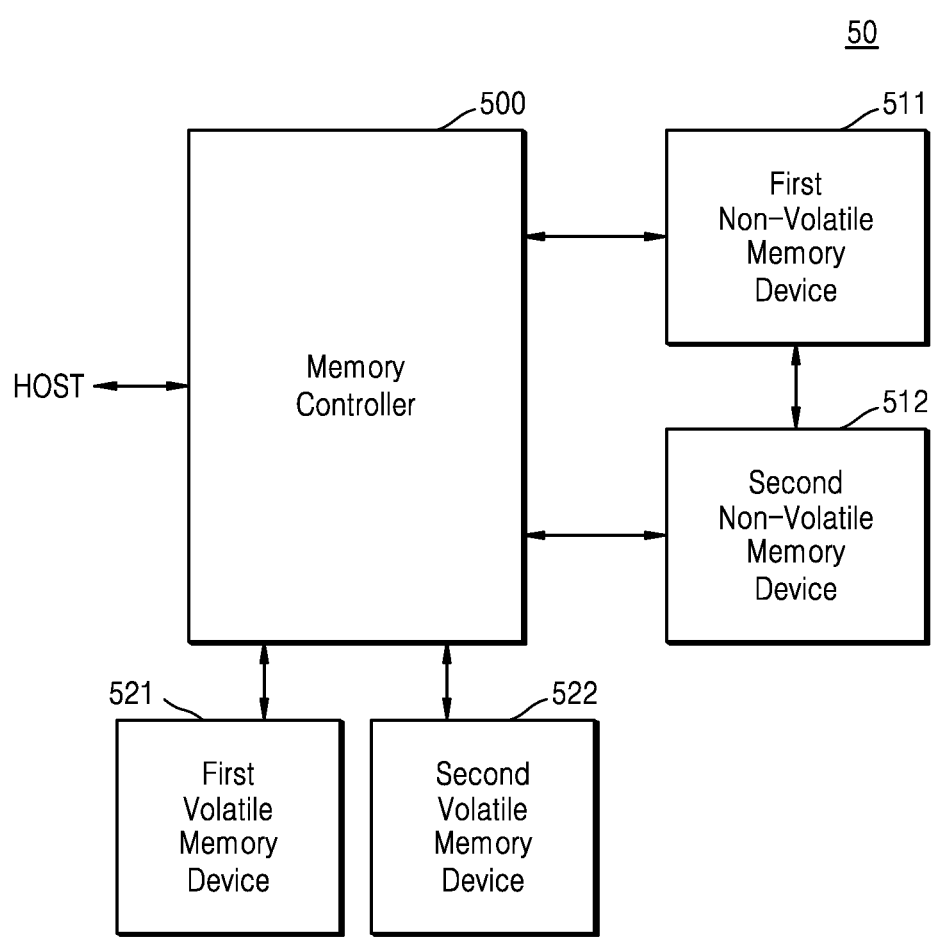
FIG. 5 is a block diagram illustrating an example of a memory system according to an embodiment of the inventive concept.

FIG. 5 is a block diagram illustrating an example of a memory system according to an embodiment of the inventive concept.

Referring to FIG. 5, a memory system 50 according to an embodiment may include a memory controller 500, a first non-volatile memory device 511, a second non-volatile memory device 512, a first volatile memory device 521, and/or a second volatile memory device 522. The memory controller 500, the first non-volatile memory device 511, the second non-volatile memory device 512, the first volatile memory device 521, and the second volatile memory device 522 may correspond to the memory controller 300, the first non-volatile memory device 311, and the second non-volatile memory device 312 of FIG. 3, respectively.

The volatile memory device that may be used in the memory system 50 may be configured to store, for example, user data, metadata, map tables, and the like. The proportion of data stored in the volatile memory device that may be used in the memory system 50 may be about 2 to about 3% of user data and about 97 to about 98% of the map table, but is not limited thereto.

In embodiments, a volatile memory device that may be used in the memory system 50 may be a high-performance volatile memory device that is relatively fast due to its role as a write buffer. However, considering the role of the volatile memory device in terms of storing the map table, in embodiments, the volatile memory device may not necessarily be a high-performance volatile memory device. Therefore, considering that the volatile memory performance varies depending on functions, the memory system 50 according to an embodiment may include a first volatile memory device 521 that is a write buffer and a second volatile memory device 522 configured to store a map table. For example, as described above, the first volatile memory device 521 may be configured to store user data that occupies a small portion of data stored in the volatile memory. In addition, the second volatile memory device 522 may be configured to store a map table that occupies a relatively large proportion of data stored in the volatile memory. Accordingly, the first volatile memory device 521 may be a data boosting memory (DBM), which is a memory that is faster and has a smaller capacity than the second volatile memory device 522.

The memory system 50 may include a first volatile memory device 521 having relatively high performance but low capacity and a second volatile memory device 522 having relatively low performance but high capacity, which may be advantageous in terms of production cost when compared with the case of including a volatile memory having relatively high performance and high capacity.

Each of the first volatile memory device 521 and the second volatile memory device 522 may be DRAM, but is not limited thereto.

Figure 6:
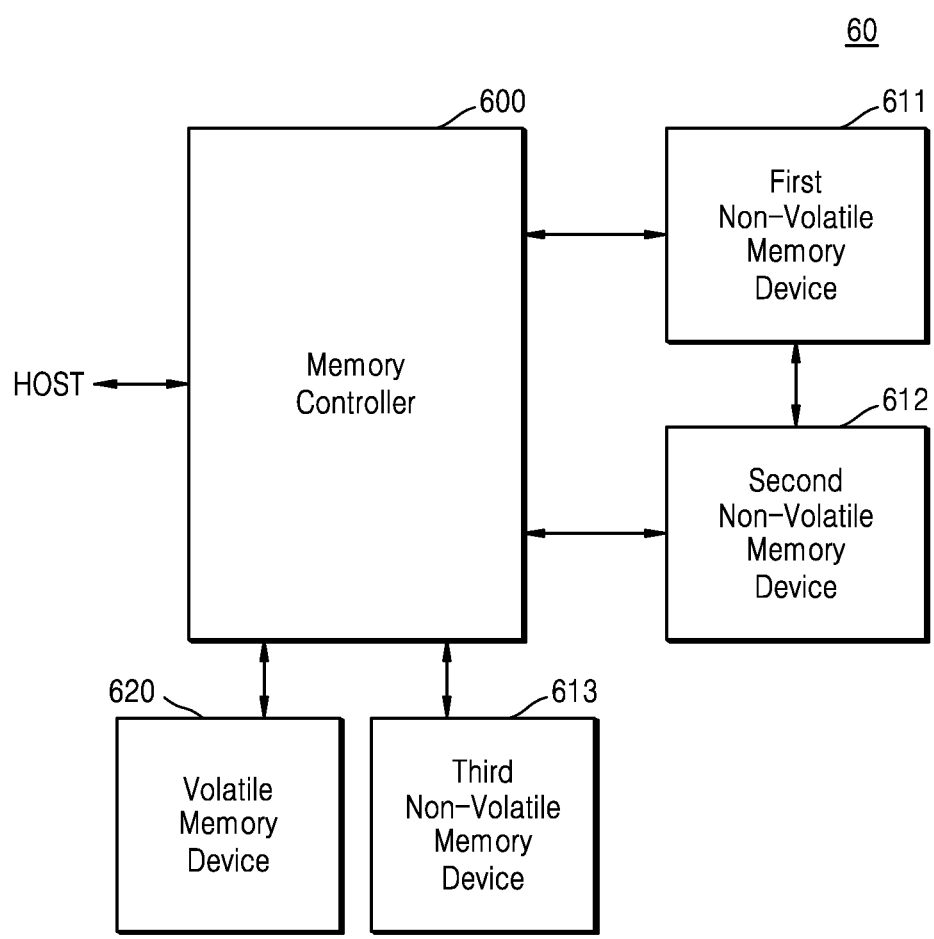
FIG. 6 is a block diagram illustrating an example of a memory system according to an embodiment of the inventive concept.

FIG. 6 is a block diagram illustrating an example of a memory system according to an embodiment of the inventive concept.

Referring to FIG. 6, a memory system 60 according to an embodiment may include a memory controller 600, a first non-volatile memory device 611, a second non-volatile memory device 612, a third non-volatile memory device 613, and/or a volatile memory device 620. The memory controller 600, the first non-volatile memory device 611, the second non-volatile memory device 612, the third non-volatile memory device 613, and the volatile memory device 620 may correspond to the memory controller 300, the first non-volatile memory device 311, the second non-volatile memory device 312, and the volatile memory device 320 of FIG. 3.

The third non-volatile memory device 613 may be configured to store a map table. As described above, the memory device storing the map table may have a relatively higher capacity than the write buffer, but not necessarily a high performance. Accordingly, the third non-volatile memory device 613 may include, for example, a resistive memory device, such as phase-change random access memory (PRAM), but is not limited thereto.

The volatile memory device 620 may be configured to store user data. The volatile memory device 620 may be a DBM that is a memory that is faster and has a smaller capacity than the third non-volatile memory device. For example, the volatile memory device 620 may be DRAM, but is not limited thereto.

In an embodiment, the first non-volatile memory device 611 and the volatile memory device 620 may be implemented as a single chip. In other words, the first non-volatile memory device 611 and the volatile memory device 620 may be mounted on the same one chip.

The memory system 60 may include a first volatile memory device 620 having relatively high performance but low capacity and a second volatile memory device 612 having relatively low performance but high capacity, which may be advantageous in terms of production cost when compared with the case of including a volatile memory having relatively high performance and high capacity.

Figure 7:
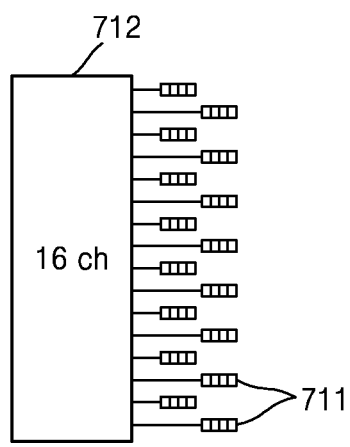
FIG. 7 is a diagram illustrating a memory device according to an embodiment of the inventive concept.

FIG. 7 is a diagram illustrating a memory device according to an embodiment of the inventive concept. Hereinafter, FIG. 7 is described with reference to FIG. 3.

Referring to FIG. 7, a memory system 7 according to an embodiment may include a plurality of first non-volatile memory devices 711 and a second non-volatile memory device 712. Each of the first non-volatile memory devices 711 may correspond to the first non-volatile memory device 311 of FIG. 3, and the second non-volatile memory device 712 may correspond to the second non-volatile memory device 312 of FIG. 3. For example, the first non-volatile memory devices 711 may be configured to receive user data from the volatile memory device 320 when a sudden power-off occurs. For example, each of the first non-volatile memory devices 711 may correspond to an MRAM, but is not limited thereto. In addition, the second non-volatile memory device 712 may be configured to receive user data from the first non-volatile memory devices 711. For example, the second non-volatile memory device 712 may correspond to a NAND flash memory device, but is not limited thereto.

A plurality of first non-volatile memory devices 711 may be arranged for each channel of the second non-volatile memory device 712. For example, as illustrated in FIG. 7, when the second non-volatile memory device 712 includes 16 channels CH, 16 first non-volatile memory devices 711 may be arranged for each channel. The number of channels of the second non-volatile memory device 712 is not limited to 16, and may vary.

In addition, in an embodiment, even when the first non-volatile memory device and the FBI circuit are configured as a single chip, the corresponding single chip may be arranged for each channel of the second non-volatile memory device 712.

The memory controller 300 may equally divide an address space of the volatile memory device 320 in which user data is stored among the at least one volatile memory device 320, by the number of channels of the second non-volatile memory device 712. In addition, the memory controller 300 may be configured to transmit the user data from the equally divided address space of the volatile memory device 320 to an address space of the plurality of first non-volatile memory devices 711.

Figure 8:
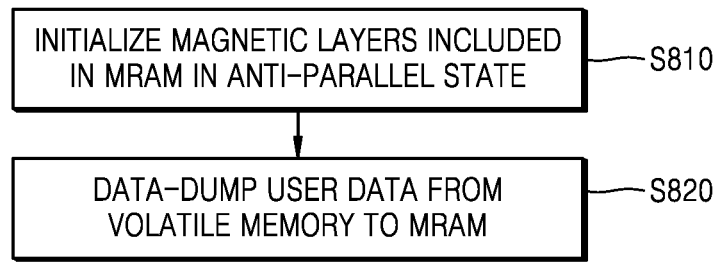
FIG. 8 is a flowchart illustrating an example of an operation method of a memory system according to an embodiment of the inventive concept.

FIG. 8 is a flowchart illustrating an example of an operation method of a memory system according to an example embodiment of the inventive concept. Hereinafter, FIG. 8 is described with reference to FIG. 3.

The memory system 30 according to an example embodiment of the inventive concept may include the memory controller 300, the first non-volatile memory device 311, the second non-volatile memory device 312, and/or the volatile memory device 320.

The first non-volatile memory device 311 may be, for example, MRAM.

In operation S810, before dumping user data from the volatile memory device 320 to the first non-volatile memory device 311, the memory controller 300 may initialize the magnetic layers included in the first non-volatile memory device 311, which is MRAM, in an anti-parallel state.

After the magnetic layers included in the first non-volatile memory device 311 are initialized to an anti-parallel state, user data may be data-dumped from the volatile memory device 320 to the first non-volatile memory device 311 in operation S820.

In the case of MRAM, the case in which data is written while the magnetic layers included in the MRAM change from an anti-parallel state to a parallel state consumes less power than the case in which data is written while the magnetic layers included in the MRAM change from a parallel state to an anti-parallel state. Accordingly, when the magnetic layers included in the first non-volatile memory device 311 are initialized to an anti-parallel state before user data is data-dumped from the volatile memory device 320 to the first non-volatile memory device 311, which is MRAM, the amount of power consumed to write user data may be reduced. As the amount of power consumed decreases, the capacity of the capacitor of the memory system 30 may be reduced.

In addition, the memory controller 300 may be configured to initialize the first non-volatile memory device 311 using the main system power supplied to the memory system 30. In other words, to initialize the first non-volatile memory device 311, the capacity of the capacitor may be reduced by using the main system power instead of using the power charged in the capacitor.

Accordingly, the memory system 30 may be implemented in a small form factor and may be advantageous in terms of production cost.

Figure 9:
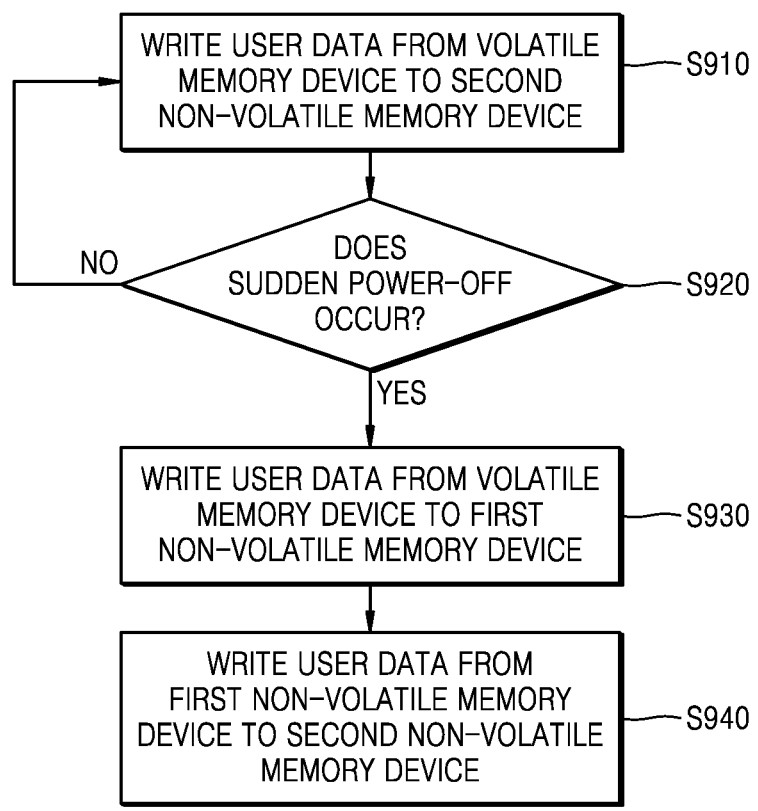
FIG. 9 is a flowchart illustrating an example of an operation method of a memory system according to an embodiment of the inventive concept.

FIG. 9 is a flowchart illustrating an example of an operation method of a memory system according to an embodiment of the inventive concept. Hereinafter, FIG. 9 is described with reference to FIG. 3.

In operation S910, the memory controller 300 may write user data from the volatile memory device 320 to the second non-volatile memory device 312 in a normal operation state.

In operation S920, it may be determined whether a sudden power-off has occurred in the memory system 30. The memory controller 300 may return to operation S910 when the sudden power-off does not occur in the memory system 30.

When a sudden power-off occurs in the memory system 30, in operation S930, the memory controller 300 may write user data from the volatile memory device 320 to the first non-volatile memory device 311.

In operation S940, the memory controller 300 may write user data from the first non-volatile memory device 311 to the second non-volatile memory device 312.

The first non-volatile memory device 311 may have a faster data write speed and a smaller capacity than the second non-volatile memory device 312.

Figure 10:
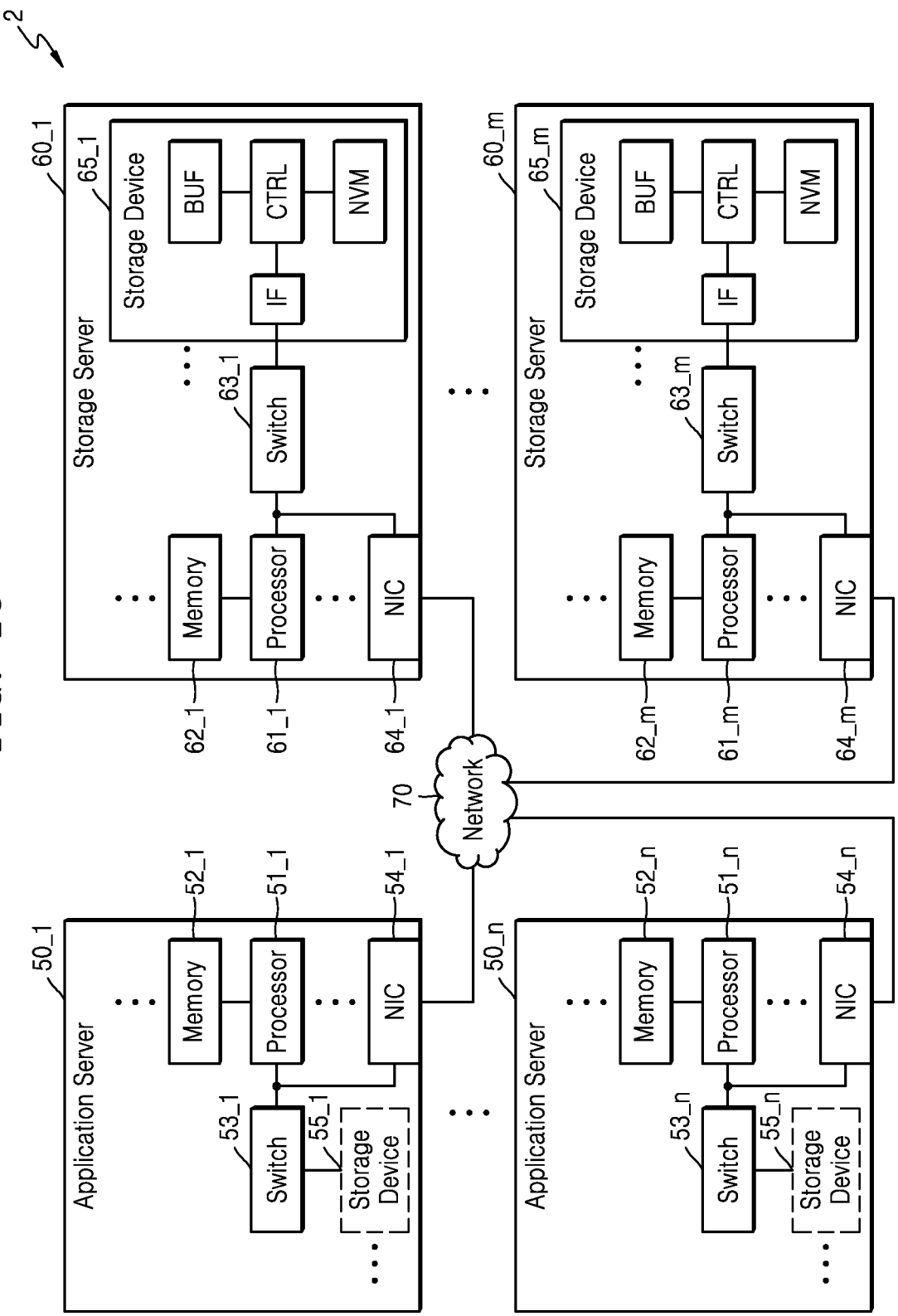
FIG. 10 is a block diagram illustrating an example of implementing a memory system according to an embodiment of the inventive concept.

FIG. 10 is a block diagram illustrating an example of implementing a memory system according to an embodiment of the inventive concept. In some embodiments, the system described above with reference to the drawings may be included in a data center 2 as an application server and/or a storage server.

Referring to FIG. 10, the data center 2 may collect various pieces of data and provide a service, and may be referred to as a data storage center. For example, the data center 2 may be a system for search engines and database operations, or a computing system used by companies such as banks or government agencies. As illustrated in FIG. 10, the data center 2 may include application servers 50_1 to 50_n and storage servers 60_1 to 60_m (m and n are integers greater than 1). The number n of application servers 50_1 to 50_n and the number m of storage servers 60_1 to 60_m may be variously selected according to embodiments, and the number n of application servers 50_1 to 50_n and the number m of storage servers 60_1 to 60_m may be different from each other.

The application servers 50_1 to 50_n may include at least one of processors 51_1 to 51_n, memories 52_1 to 52_n, switches 53_1 to 53_n, network interface controllers (NICs) 54_1 to 54_n, and storage devices 55_1 to 55_n. The processors 51_1 to 51_n may control overall operations of the application servers 50_1 to 50_n, and may access the memories 52_1 to 52_n to execute instructions and/or data loaded into the memories 52_1 to 52_n. The memories 52_1 to 52_n may include, for example, Double Data Rate Synchronous DRAM (DDR SDRAM), High Bandwidth Memory (HBM), Hybrid Memory Cube (HMC), Dual In-line Memory Module (DIMM), Optane DIMM, or Non-Volatile DIMM (NV DIMM).

According to an embodiment, the number of processors and the number of memories included in the application servers 50_1 to 50_n may be variously selected. In some embodiments, the processors 51_1 to 51_n and the memories 52_1 to 52_n may provide processor-memory pairs. In some embodiments, the number of processors 51_1 to 51_n may be different from the number of memories 52_1 to 52_n. The processors 51_1 to 51_n may include single core processors or multi-core processors. In some embodiments, as illustrated by a dashed line in FIG. 13, the storage devices 55_1 to 55_n may be omitted from the application servers 50_1 to 50_n. The number of storage devices 55_1 to 55_n included in the storage servers 60_1 to 60_m may be variously selected according to embodiments. The processors 51_1 to 51_n, the memories 52_1 to 52_n, the switches 53_1 to 53_n, the NICs 54_1 to 54_n, and/or the storage devices 55_1 to 55_n may communicate with each other through the link described above with reference to the drawings.

The storage servers 60_1 to 60_m may include at least one of processors 61_1 to 61_m, memories 62_1 to 62_m, switches 63_1 to 63_m, NICs 64_1 to 64_n, and storage devices 65_1 to 65_m. The processors 61_1 to 61_m and the memories 62_1 to 62_m may operate similarly to the processors 51_1 to 51_n and the memories 52_1 to 52_n of the application servers 50_1 to 50_n described above.

The application servers 50_1 to 50_n and the storage servers 60_1 to 60_m may communicate with each other through a network 70. In some embodiments, the network 70 may be implemented using a fibre channel (FC), Ethernet, or the like. The FC may be a medium used for relatively high-speed data transmission, and an optical switch providing high performance/high availability may be used as the FC. The storage servers 60_1 to 60_m may be provided as file storages, block storages, or object storages according to the access methods of the network 70.

In some embodiments, the network 70 may be a storage-dedicated network, such as a storage area network (SAN). For example, the SAN may be an FC-SAN that may use an FC network and may be implemented according to an FC Protocol (FCP). Alternatively, the SAN may be an IP-SAN implemented according to a SCSI over TCP/IP or Internet SCSI (iSCSI) protocol using a TCP/IP network. In some embodiments, the network 70 may be a general network, such as a TCP/IP network. For example, the network 70 may be implemented according to protocols, such as FC over Ethernet (FCoE), network attached storage (NAS), and NVMe over Fabrics (NVMe-oF).

Hereinafter, the application server 50_1 and the storage server 60_1 are mainly described. The description of the application server 50_1 may be applied to other application servers (e.g., 50_n), and the description of the storage server 60_1 may be applied to other storage servers (e.g., 60_m).

The application server 50_1 may store data requested to be stored by a user or a client in one of the storage servers 60_1 to 60_m through the network 70. In addition, the application server 50_1 may acquire data requested to be read by a user or a client from one of the storage servers 60_1 to 60_m through the network 70. For example, the application server 50_1 may be implemented as a web server or a database management system (DBMS).

The application server 50_1 may access the memory 52_n and/or the storage device 55_n included in the other application server 50_n through the network 70 and/or the memories 62_1 to 62_m and/or the storage devices 65_1 to 65_m included in the storage servers 60_1 to 60_m through the network 70. Accordingly, the application server 50_1 may perform various operations on data stored in the application servers 50_1 to 50_n and/or the storage servers 60_1 to 60_m. For example, the application server 50_1 may execute a command for moving or copying data between the application servers 50_1 to 50_n and the storage servers 60_1 to 60_m. In this case, data may be moved from the storage devices 65_1 to 65_m of the storage servers 60_1 to 60_m through the memories 62_1 to 62_m of the storage servers 60_1 to 60_m or directly to the memories 52_1 to 52_n of the application servers 50_1 to 50_n. In some configurations, data moving through the network 70 may be data encrypted for security or privacy.

In the storage server 60_1, an interface IF may provide a physical connection between the processor 61_1 and a controller CTRL and a physical connection between the NIC 64_1 and the controller CTRL. For example, the interface IF may be implemented in a direct attached storage (DAS) method that directly connects the storage device 65_1 with a dedicated cable. In addition, for example, the interface IF may be implemented in various interface schemes, such as Advanced Technology Attachment (ATA), Serial ATA (SATA), external SATA (e-SATA), Small Computer Small Interface (SCSI), Serial Attached SCSI (SAS), Peripheral Component Interconnection (PCI), PCI Express (PCIe), NVM express (NVMe), IEEE 1394, universal serial bus (USB), secure digital (SD) card, Universal Flash Storage (UFS), Embedded Universal Flash Storage (eUFS), and compact flash (CF) card interface.

In the storage server 60_1, the switch 63_1 may selectively connect the processor 61_1 to the storage device 65_1 under control of the processor 61_1, or selectively connect the NIC 64_1 to the storage device 65_1 thereunder.

In some embodiments, the NIC 64_1 may include a network interface card, a network adapter, and the like. The NIC 54_1 may be connected to the network 70 by, for example, a wired interface, a wireless interface, a Bluetooth interface, an optical interface, and the like. The NIC 54_1 may include an internal memory, a DSP, a host bus interface, and the like, and may be connected to the processor 61_1 and/or the switch 63_1 through the host bus interface. In some embodiments, the NIC 64_1 may be integrated with at least one of the processor 61_1, the switch 63_1, and the storage device 65_1.

In the application servers 50_1 to 50_n or the storage servers 60_1 to 60_m, the processors 51_1 to 51_m or 61_1 to 61_n may transmit commands to the storage devices 55_1 to 55_n and 65_1 to 65_m, or the memories 52_1 to 52_n and 62_1 to 62_m, to program data or read data. In this case, the data may be error-corrected data through an error correction code (ECC) engine. The data is data processed by Data Bus Inversion (DBI) or Data Masking (DM) and may include cyclic redundancy code (CRC) information. The data may be data encrypted for security or privacy.

The storage devices 55_1 to 55_n, and 65_1 to 65_m may transmit control signals and command/address signals to non-volatile memory devices (e.g., NAND flash memory devices (NVMs) in response to read commands received from the processors 51_1 to 51_m and 61_1 to 61_n. Accordingly, when data is read from a non-volatile memory device NVM, the read enable signal may be input as a data output control signal and may output data to the DQ bus. A data strobe signal may be generated using the read enable signal. The command and address signal may be latched according to a rising edge or a falling edge of the write enable signal.

The controller CTRL may control the overall operation of the storage device 65_1. In an embodiment, the controller CTRL may include static random access memory (SRAM). The controller CTRL may write data to the non-volatile memory device NVM in response to a write command, or may read data from the non-volatile memory device NVM in response to a read command. For example, a write command and/or a read command may be generated based on a request provided by a host, for example, a processor 61_1 in a storage server 60_1, a processor 61_m in another storage server 60_m, or the processors 51_1 to 51_n in the application servers 50_1 to 50_n. A buffer BUF may temporarily store (buffer) data to be written to the non-volatile memory device NVM or data read from the non-volatile memory device NVM. In some embodiments, the buffer BUF may include DRAM. In addition, the buffer BUF may store metadata, and the metadata may refer to user data or data generated by the controller CTRL to manage the non-volatile memory device NVM. The storage device 65_1 may include a secure element (SE) for security or privacy.

In an embodiment of the inventive concept, a three dimensional (3D) memory array is provided. The 3D memory array is monolithically formed in one or more physical levels of arrays of memory cells having an active area disposed above a silicon substrate and circuitry associated with the operation of those memory cells, whether such associated circuitry is above or within such substrate. The term "monolithic" means that layers of each level of the array are directly deposited on the layers of each underlying level of the array. In an embodiment of the inventive concept, the 3D memory array includes vertical NAND strings that are vertically oriented such that at least one memory cell is located over another memory cell. The at least one memory cell may include a charge trap layer. The following patent documents, which are hereby incorporated by reference, describe suitable configurations for three-dimensional memory arrays, in which the three-dimensional memory array is configured as a plurality of levels, with word lines and/or bit lines shared between levels: U.S. Pat. Nos. 7,679,133; 8,553,466; 8,654,587; 8,559,235; and US Pat. Pub. No. 2011/0233648.

While the inventive concept has been particularly shown and described with reference to embodiments thereof, it will be understood by those of ordinary skill in the art that various changes in form and detail may be made therein without departing from the spirit and scope of the inventive concept as defined by the following claims.

What is claimed is:

1. A memory system, comprising:
a printed circuit board;
a first non-volatile memory device;
a second non-volatile memory device;
at least one volatile memory device configured to store user data or a map table; and
a memory controller configured to data-dump the user data from the at least one volatile memory device to the first non-volatile memory device when a sudden power-off occurs,
wherein the first non-volatile memory device has a faster speed at which data is written than the second non-volatile memory device and has a smaller capacity than the second non-volatile memory device, wherein the first non-volatile memory device, the second non-volatile memory device, the at least one volatile memory device, and the memory controller are arranged on the printed circuit board, wherein the first non-volatile memory device comprises a magnetic random access memory (MRAM), wherein the memory controller initializes magnetic layers included in the MRAM to an anti-parallel state before data-dumping the user data from the at least one volatile memory device to the MRAM, and transitions the magnetic layers included in the MRAM from the anti-parallel state to a parallel state while the user data is written to the MRAM.

2. The SSD memory system of claim 1, further comprising:
a frequency boosting interface (FBI) circuit,
wherein the first non-volatile memory device and the FBI circuit are mounted on a same one chip.

3. The SSD memory system of claim 1, wherein the at least one volatile memory device comprises a first volatile memory device comprising a write buffer and a second volatile memory device configured to store the map table.

4. The memory system of claim 3, wherein the first volatile memory device comprises a data boosting memory (DBM), and the DBM is faster than the second volatile memory device and has a smaller capacity than the second volatile memory device.

5. The SSD memory system of claim 4, wherein each of the first volatile memory device and the second volatile memory device comprises a dynamic random access memory (DRAM).

6. The memory system of claim 4, wherein the memory controller is configured to initialize the first non-volatile memory device using main system power supplied to the solid state drive.

7. The memory system of claim 1, further comprising:
a plurality of first non-volatile memory devices, wherein the first non-volatile memory device is included in the plurality of first non-volatile memory devices,
the second non-volatile memory device comprises a NAND flash memory, and
the plurality of first non-volatile memory devices are respectively arranged corresponding to channels of the second non-volatile memory device.

8. The memory system of claim 7, wherein the memory controller is configured to equally divide an address space of the at least one volatile memory device in which the user data is stored, by a number of channels among the at least one volatile memory device, and transmit the user data from the equally divided address space to an address space of the plurality of first non-volatile memory devices.

9. The memory system of claim 1, wherein the memory system is a solid state drive (SSD).

10. A memory system, comprising:
a printed circuit board;
a first non-volatile memory device;
a second non-volatile memory device;
a third non-volatile memory device configured to store a map table;
a volatile memory device configured to store user data; and
a memory controller configured to data-dump the user data from the volatile memory device to the first non-volatile memory device when a sudden power-off occurs, wherein the first non-volatile memory device has a faster speed at which data is written than the second non-volatile memory device and has a smaller capacity than the second non-volatile memory device, wherein the first non-volatile memory device, the second non-volatile memory device, the third non-volatile memory device, the volatile memory device, and the memory controller are arranged on the printed circuit board, wherein the first non-volatile memory device comprises a magnetic random access memory (MRAM), wherein the memory controller initializes magnetic layers included in the MRAM to an anti-parallel state before data-dumping the user data from the at least one volatile memory device to the MRAM, and transitions the magnetic layers included in the MRAM from the anti-parallel state to a parallel state while the user data is written to the MRAM.

11. The memory system of claim 10, further comprising:
a frequency boosting interface (FBI) circuit connected to the second non-volatile memory device.

12. The memory system of claim 10, wherein the volatile memory device comprises a data boosting memory (DBM), and the DBM is faster than the third non-volatile memory device and has a smaller capacity than the third non-volatile memory device.

13. The memory system of claim 10, wherein the first non-volatile memory device and the volatile memory device are mounted on a same one chip.

14. The memory system of claim 10, wherein the third non-volatile memory device comprises a phase-change random access memory (PRAM), and
the volatile memory device comprises a dynamic random access memory (DRAM).

15. The memory system of claim 10, wherein the memory controller is configured to initialize the first non-volatile memory device using main system power supplied to the solid state drive.

16. The memory system of claim 10, further comprising:
a plurality of first non-volatile memory devices, wherein the first non-volatile memory device is included in the plurality of first non-volatile memory devices,
the second non-volatile memory device comprises a NAND flash memory, and
the plurality of first non-volatile memory devices are arranged corresponding to channels of the second non-volatile memory device.

17. The memory system of claim 10, wherein the memory system is a solid state drive (SSD).

18. A method of operating a memory system including a first non-volatile memory device, a second non-volatile memory device, and a volatile memory device, the method comprising:
writing user data from the volatile memory device to the second non-volatile memory device in a normal operation state;
initializing magnetic layers included in the first non-volatile memory device, which comprises a magnetic random access memory (MRAM), to an anti-parallel state;
writing the user data from the volatile memory device to the MRAM when a sudden power-off occurs,
wherein the magnetic layers included in the MRAM are initialized to the anti-parallel state before the user data is written from the volatile memory device to the MRAM, and the magnetic layers included in the MRAM transition from the anti-parallel state to a parallel state while the user data is written to the MRAM; and writing the user data from the first non-volatile memory device to the second non-volatile memory device, wherein the first non-volatile memory device has a faster speed at which data is written than the second non-volatile memory device and has a smaller capacity than the second non-volatile memory device, and the first non-volatile memory device, the second non-volatile memory device, and the volatile memory device are arranged on a printed circuit board in the SSD.

19. The method of claim 18, wherein the memory system is a solid state drive (SSD).

* * * * *